United States Patent Office 2,943,074
Patented June 28, 1960

2,943,074

VINYL HALIDE POLYMER COMPOSITIONS CONTAINING POLYMERIZATION PRODUCTS OF METHYL METHACRYLATE WITH A BUTADIENE-STYRENE COPOLYMER

Seymour S. Feuer, Feasterville, Pa., assignor to Rohm & Haas Company, Philadelphia, Pa., a corporation of Delaware No Drawing. Filed June 4, 1956, Ser. No. 588,961

3 Claims. (Cl. 260—45.5)

This invention relates to solid thermoplastic compositions having a variety of uses including its use in the manufacture of plastic pipe and calendered plastic sheeting. More particularly, such invention comprises an intimate admixture or blend of a vinyl halide polymer or copolymer with a thermoplastic composition formed from a styrene-butadiene copolymer latex and a monomeric material solely or preponderantly of methyl methacrylate. The resulting admixture or blend overcomes many of the well-known deficiencies of vinyl halides per se when used to produce objects by injection molding, extrusion, or calendering. For instance, the admixture when subjected to such forming methods not only can be more readily processed but also results in formed objects with such highly desirable properties as toughness, high shock resistance, high impact strength, high heat distortion temperature, and resistance to solvents, as well as having other advantages such as stability and lowered costs.

Polyvinyl halides, in accordance herewith, are used in the ratios hereinafter specified. They comprise one or more of the normally rigid, hard, tough, polymeric products solely or preponderantly of vinyl chloride, vinyl fluoride, and vinyl bromide, or copolymers containing at least 50% vinyl halide with other monoolefinic monomers that form therewith normally rigid, copolymerized products. Such monoolefinic monomers include vinylidene halides, such as the chloride; vinyl esters such as vinyl acetate, butyrate or benzoate; acrylic and α-alkyl acrylic acids, their alkyl esters, amides and nitriles such as acrylic or methacrylic acid, ethyl acrylate, octyl acrylate, methyl methacrylate, acrylamide, acrylonitrile; vinyl aromatic compounds such as the styrenes including styrene itself, chlorostyrene and ethyl styrene; vinyl naphthalene; alkyl esters of maleic and fumaric acid such as dimethyl maleate; vinyl alkyl ethers and vinyl alkyl ketones; vinyl pyridine and isobutylene. Polyvinyl chloride per se or a copolymer of vinyl chloride with one or more of the monoolefinic monomers above referred to is preferred. If a copolymer is used it is preferred that it contain 70 to 90% by weight of vinyl chloride.

The other essential component or constituent of the blend with which this invention is concerned, namely, a composition formed from a styrene-butadiene copolymer latex and a monomeric material solely or preponderantly of methyl methacrylate, is disclosed and claimed in part in copending application Serial No. 547,031, filed November 15, 1955, now Patent No. 2,857,360. As described in that application, 85 to 65 parts by weight of monomeric methyl methacrylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15 to 35 parts by weight of solids in a styrene-butadiene copolymer latex. The copolymer solids in the latex comprise about 10 to 50% by weight of styrene and about 90 to 50% by weight of butadiene and the molecular weight thereof is within the range of about 25,000 to 1,500,000. The copolymer latex of solids in water contains a dispersing agent such as sodium oleate or the like to maintain the copolymer in suspension. Interpolymerization of the monomer or monomeric mixture with the copolymer solids suspended in water is brought about in the presence of a free-radical generating catalyst and a polymerization regulator which serves as a chain transfer agent, at a temperature of the order of 15° C. to 80° C. Coagulation of the interpolymerized product is then effected with a calcium chloride solution, for instance, whereupon it is filtered, washed and dried. In addition to the compositions disclosed in said earlier filed application, there may be employed as the other essential component in the composition here disclosed and claimed a composition in substantial respects similar to that referred to in the earlier filed application, differing therefrom only in that the ratio of monomeric material solely or preponderantly of methyl methacrylate to the butadiene-styrene copolymer latex in the presence of which it is polymerized extends from 85 to 25 parts by weight of the former to 15 to 75 parts by weight of the latter rather than the ratios in parts by weight set forth in lines 5 to 8, page 4, of said earlier filed application. Thus, in the admixture or blend of the present invention not only may the rigid compositions of the earlier application be used but also there may be used compositions which to some extent are rubbery, so long as they come within the ratio above set forth. In preparing these rubbery compositions the same steps of process are followed as are given on pages 2 and 3 of the earlier filed application using ratios of monomer to latex within the range above indicated.

Blending of the polyvinyl halide with the methacrylate-butadiene-styrene composition both in dry particle form may be carried out in conventional plastics bending equipment such as a roller mill, Banbury mixer or extruder. For instance, mixing of the dry particles of the two materials may be accomplished by tumbling them in the ratios above specified in the usual equipment employed to effect intimate mixing of plastic particles for a period of about an hour at a temperature of the order of 60° to 80° C. The dry, free-flowing admixture may then, for example, be fed directly into an extruder of conventional design equipped with suitable dies for producing continuous formed objects, such as sheets, rods, or tubes. Other method of blending known in the art where heat is not applied may also be utilized to bring about blending provided that in the subsequent processing of the material it is thoroughly masticated under heat and pressure such as may be accomplished by passing it through heated mill rolls run, for example, at 300 to 350° F, for a period of 5 to 10 minutes.

The particle size of the respective materials intimately admixed to form the composition with which this invention is concerned may be varied within a relatively wide range. To some extent such particle sizes will be governed by how the composition is to be used. For instance, if the mixture is to be extruded to form continuous sheets, rods, or tubes, the vinyl halide may be in the form of a fine powder of a particle size from 6 to 32 on the Fisher sub-sieve scale while the composition formed from methacrylate, butadiene and styrene may be of the order of 10 mesh. As will be understood, the particle size of the respective materials which are blended in accordance herewith are chosen from those sizes that can be formed by grinding, pelleting, or similar types of operation recognized in the art. The most convenient size for effecting thorough and intimate admixing in the particular apparatus available is usually chosen.

The weight ratio of vinyl halide to the aforesaid composition to form a blend having the desirable properties and advantages of compositions within the scope of this invention is important. The vinyl halide polymer may vary from 85 to 50 parts by weight to 15 to 50 parts by weight of the methacrylate-butadiene-styrene composition.

Hereinafter, the first essential component, constituent or ingredient of the novel, solid, thermoplastic composition with which this invention is concerned will be referred to as the vinyl polymer and the second essential component, constituent or ingredient will be referred to as the coemulsified polymer, it being understood that these generic expressions refer to what heretofor has been said respecting the general character and content of the individual compositions so designated.

The following examples will show the unique advantages of compositions within the purview of this invention.

Examples—Tables I and II.

TABLE I

| Property | Parts of Coemulsified Polymer "A"/100 Parts Polyvinyl Chloride | | | | |
|---|---|---|---|---|---|
| | 0 | 25 | 50 | 100 | 150 |
| Flexural Strength, p.s.i. | 13,500 | 12,500 | 11,000 | 10,050 | 10,100 |
| Izod Impact Strength, ft. lb./in. notch | 0.45 | 1.32 | 3.01 | 6.96 | 6.27 |
| Heat Distortion Temp., °C. | 74.0 | 80.0 | 82.0 | 84.0 | 84.0 |

TABLE II

| Property | Parts of Modifying Polymer/100 Parts Polyvinyl Chloride | | | | |
|---|---|---|---|---|---|
| | 100(A) | 33(B) | 17.6(C) | 17.6(D) | 100(E) |
| Flexural Strength, p.s.i. | 11,000 | 12,000 | 12,000 | 7,000 | 9,000 |
| Izod Impact Strength, ft. lb./in. notch | 8.0 | 8.0 | 8.0 | 1.0 | 1.4 |
| Heat Distortion Temp., °C. | 82.5 | 80.0 | 75.0 | 74.0 | 76 |

Table I shows the effect of blending a coemulsified polymer (designated "A") with a medium molecular weight, 100% vinyl chloride polymer at different weight ratios. It will be noted that the impact strength and heat distortion temperatures are greatly improved as the proportion of coemulsified polymer is increased.

Table II shows the effect of varying the type of coemulsified polymer "A," "B," "C," and of substituting a butadiene-styrene rubbery copolymer "D," or a mechanical mixture of methacrylic acid ester polymer and butadiene-styrene polymer "E" for the coelmulsified polymer.

It may be observed that the coemulsified polymers "A," "B," and "C" show considerably better impact strength than the butadiene-styrene rubbery polymer "D" or the mechanical mixture "E." This shows the necessity for coemulsifying methacrylic acid ester and butadiene-styrene rubbery polymer in order to obtain optimum shock resistance.

*Preparation of blends with vinyl halides referred to in Tables I and II*

The vinyl halide used was a medium molecular weight, 100% polyvinyl chloride polymer in powdery form.

In the case of polymers "A," "B," "C," and "E," the vinyl halide polymer and the modifying polymer were mixed as dry powders, 1.5 parts of a dibutyl tin mercaptide were added to 100 parts of mixed powders, and the mixture was milled for 10 minutes at 320° F. on a roller mill. For the data in Table I, the milled sheets were granulated and injected into test bars using a cylinder temperature of 200° C. and a 1.5 minute injection cycle in the injection molding machine.

For the data in Table II, the milled sheet was pressed into flat, press-polished sheets by heating them for five minutes at 175° C., applying 1000 p.s.i. for 30 seconds, and cooling while still under pressure.

Polymer "D"/vinyl halide blends were prepared by dispersing powdered vinyl halide polymer in polymer "D" latex, coagulating, washing, and drying the resulting polymer, and subsequently milling and press-polishing as described above.

*Preparation of coemulsified polymer "A"*

| | Parts by wt. |
|---|---|
| Methyl methacrylate | 71.25 |
| Acrylonitrile | 3.75 |
| Butadiene-styrene copolymer latex [1] solids | 25.0 |
| Water | 150.0 |
| Sodium lauryl sulfate | 3.75 |
| 2,2', bis-azoisobutyronitrile | .075 |
| Dodecyl mercaptan | .49 |

[1] This is same as polymer latex "D."

Agitate all ingredients to form stable emulsion. Heat for 24 hours at 60° C. Coagulate, wash, and dry under vacuum.

*Preparation of coemulsified polymer "B"*

| | Parts by wt. |
|---|---|
| Methyl methacrylate | 50.0 |
| Butadiene-styrene rubbery copolymer latex [1] solids | 50.0 |
| Water | 150.0 |
| Sodium lauryl sulfate | 3.75 |
| Benzoyl peroxide | .05 |
| Dodecyl mercaptan | .22 |

[1] Same as polymer latex "D."

Polymerize as above.

*Preparation of copolymer latex "C"*

| | Parts by wt. |
|---|---|
| Methyl methacrylate | 25.0 |
| Butadiene-styrene copolymer latex [1] solids | 75.0 |
| Water | 150.0 |
| Benzoyl peroxide | .05 |
| Sodium sulfoxylate formaldehyde | .025 |
| Dodecyl mercaptan | .44 |

[1] Same as polymer latex "D."

Polymerize as above.

*Preparation of rubbery copolymer "D"*

| | Parts by wt. |
|---|---|
| Butadiene-1,3 | 70.0 |
| Styrene | 30.0 |
| Water | 150.0 |
| Sodium lauryl sulfate | 5.0 |
| Potassium persulfate | .2 |
| Dodecyl mercaptan | .05 |

Polymerize by heating at 60° C. for 24 hours. Remove unreacted monomer by degassing under vacuum. Do not coagulate.

*Preparation of mixed polymer "E"*

PART I.—METHACRYLATE POLYMER

| | Parts by wt. |
|---|---|
| Methyl methacrylate | 100.0 |
| Water | 150.0 |
| Sodium lauryl sulfate | 5.0 |
| Potassium persulfate | .2 |
| Dodecyl mercaptan | .44 |

Heat at 60° C. for 24 hours.

PART II

Mix 100 parts of polymer latex of Part I, above, with 100 parts of rubbery polymer latex "D." Coagulate mixture, wash, and dry.

There may, of course, be added to the mixture or blend in minor proportions suitable heat and light stabilizers, clarity improvers, ultra violet light screening agents, pigments when color and/or translucency is desired, and the like as is well understood in the art.

I claim:

1. A composition comprising a blend of (a) 85 to 50 parts by weight of a member of the group consisting of polymerized vinyl halides and copolymers of at least 50% by weight of vinyl halide with other monoolefinic monomers copolymerizable therewith, and (b) 15 to 50 parts by weight of a solid thermoplastic interpolymer of 85 to 25 parts by weight of a member of the group consisting of methyl methacrylate and mixtures of at least 55% by weight methyl methacrylate with another compound having a single vinylidene group copolymerizable therewith, and 15 to 75 parts by weight of a copolymer of 90 to 50% by weight of butadiene and 10 to 50% by weight of styrene.

2. The composition of claim 1 wherein methyl methacrylate is interpolymerized with the butadiene-styrene copolymer.

3. A composition comprising a blend of (a) 85 to 50 parts by weight of polymerized vinyl chloride, and (b) 15 to 50 parts by weight of a solid thermoplastic interpolymer of 85 to 25 parts by weight of a member of the group consisting of methyl methacrylate and mixtures of at least 55% by weight methyl methacrylate with another compound having a single vinylidene group copolymerizable therewith, and 15 to 75 parts by weight of a copolymer of 90 to 50% by weight of butadiene and 10 to 50% by weight of styrene.

References Cited in the file of this patent

UNITED STATES PATENTS

| | | |
|---|---|---|
| 2,414,803 | D'Alelio | Jan. 28, 1947 |
| 2,512,697 | Grotenhuis | June 27, 1950 |